United States Patent
VanBlon et al.

(10) Patent No.: US 9,715,623 B2
(45) Date of Patent: Jul. 25, 2017

(54) REDUCED DOCUMENT STROKE STORAGE

(71) Applicant: LENOVO (Singapore) PTE, LTD., New Tech Park (SG)

(72) Inventors: Russell Speight VanBlon, Raleigh, NC (US); Grigori M. Zaitsev, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/736,035

(22) Filed: Jun. 10, 2015

(65) Prior Publication Data

US 2016/0364607 A1 Dec. 15, 2016

(51) Int. Cl.
*G06K 9/00* (2006.01)
*G06F 3/041* (2006.01)
*G06F 3/0488* (2013.01)
*G06K 9/22* (2006.01)

(52) U.S. Cl.
CPC ....... *G06K 9/00416* (2013.01); *G06F 3/0416* (2013.01); *G06F 3/04883* (2013.01); *G06K 9/00409* (2013.01); *G06K 9/00422* (2013.01); *G06K 9/222* (2013.01)

(58) Field of Classification Search
CPC ............... G06K 9/222; G06K 9/00416; G06K 9/00422; G06F 3/04883; G06F 3/033; F02B 2075/025; G09B 5/065
USPC ....... 382/100, 108, 181, 186, 189, 187, 185, 382/224, 190, 195, 199, 203, 204, 197, 382/202, 209, 312, 313, 314, 307; 704/1, 704/200, 231, 251, 255, 257; 345/156, 345/179; 358/1.1, 1.11

See application file for complete search history.

(56) References Cited

U.S. PATENT DOCUMENTS

| | | | | |
|---|---|---|---|---|
| 5,513,278 A * | 4/1996 | Hashizume | ........ | G06K 9/00422 345/467 |
| 5,835,632 A * | 11/1998 | Takasu | ...................... | G06K 9/42 382/159 |
| 6,320,985 B1 * | 11/2001 | Perrone | ................ | G06K 9/6256 382/159 |
| 7,009,612 B2 * | 3/2006 | Hakamada | ............ | G06T 11/203 345/467 |
| 7,469,062 B2 * | 12/2008 | Napper | ................ | G06K 9/6814 345/179 |

(Continued)

FOREIGN PATENT DOCUMENTS

| | | |
|---|---|---|
| EP | 2056237 A1 | 4/2008 |
| WO | 01/44885 A2 | 6/2001 |

*Primary Examiner* — Sheela C Chawan
(74) *Attorney, Agent, or Firm* — Kunzler Law Group

(57) ABSTRACT

For reduced storage of user stroke data, systems, apparatus, and methods are disclosed. The apparatus includes a handwriting input device that receives input stroke data, a processor, and a memory that stores code executable by the processor, the code including code that identifies a handwritten character from the stroke data, maps the handwritten character to a user-specific font character based on the stroke data, and creates a file storing a character encoding corresponding to the user-specific font character. The handwriting input device may include an input device selected from the group consisting of: a touchscreen, a touch panel, a digitizer, a digital pen, a scanner, an imager, and a digital camera.

20 Claims, 6 Drawing Sheets

(56) References Cited

U.S. PATENT DOCUMENTS

| | | | | |
|---|---|---|---|---|
| 7,657,094 B2* | 2/2010 | Lin | .................... | G06K 9/00416 |
| | | | | 382/186 |
| 8,989,496 B2* | 3/2015 | Motoi | ...................... | G06K 9/18 |
| | | | | 382/178 |
| 9,330,331 B2* | 5/2016 | Kasthuri | .............. | G06K 9/4609 |
| 2005/0105799 A1 | 5/2005 | Strohecker et al. | | |
| 2013/0201133 A1 | 8/2013 | Oh | | |

\* cited by examiner

REDUCED DOCUMENT STROKE STORAGE

FIELD

The subject matter disclosed herein relates to saving stroke data and more particularly relates to reduced document stroke storage.

BACKGROUND

Description of the Related Art

Stroke data takes large amounts of space. Sample rate may reach 133 points per second, which converts into data bit rate greater than 5 kbps, resulting in average document size of 10-20 MB. With average student taking digital notes 4 hours a day, it will result in storage requirement of 1.5 GB per month or approximately 13 GB per school year (assuming 9 months of lessons and 3 months break). Such volumes present a problem for local storage, especially limited SSD on tablets. The large storage requirement is also problematic for remote (e.g., cloud based) storage solutions that may experience scaling issues related to high bandwidth and storage volume.

BRIEF SUMMARY

An apparatus for reduced storage of stroke data is disclosed. A method and computer program product also perform the functions of the apparatus. The apparatus includes a handwriting input device that receives input stroke data, a processor, and a memory that stores code executable by the processor, the code including code that identifies a handwritten character from the stroke data, maps the handwritten character to a user-specific font character based on the stroke data, and creates a file storing a character encoding corresponding to the user-specific font character. The handwriting input device may include an input device selected from the group consisting of: a touchscreen, a touch panel, a digitizer, a digital pen, a scanner, an imager, and a digital camera.

In certain embodiments, mapping the handwritten character to a user-specific font character includes determining whether the stroke data of the handwritten character matches a font character of a user-specific font set associated with a user inputting the stroke data, selecting a matching font character, in response to the stroke data matching the font character, and generating a new font character based on the stroke data, in response to the stroke data not matching any font character of the font set. The user-specific font set may include a plurality of variants of a text character corresponding to the handwritten character, wherein selecting a matching font character includes selecting a best fitting variant based on the stroke data.

In some embodiments, the apparatus includes code that reads the file, and displays a text character indicated by the character encoding using the user-specific font character. The apparatus may also include code that stores, in the file, a character position of the handwriting character, wherein displaying the text character includes displaying the text character at the character position.

In some embodiments, the apparatus includes code that erases the stroke data in response to mapping the handwritten character to a user-specific font character based on the stroke data. The apparatus may further include code that determines a deviation between the handwritten character and a model character, wherein the file further stores the deviation between the handwritten character and the model character.

In certain embodiments, identifying the handwritten character includes receiving stroke data from the handwriting input device, the stroke data including user handwriting, performing handwriting recognition on the stroke data, and identifying a text character matching the handwritten character, based on the handwriting recognition, wherein the character encoding corresponds to the identified text character. In certain embodiments, mapping the handwritten character to a user-specific font character includes generating a single user-specific font character representing two adjacent handwritten letters.

The method includes identifying, by use of a processor, a handwritten character from stroke data, mapping the handwritten character to a user-specific font character based on the stroke data, and storing a character encoding corresponding to the user-specific font character. In some embodiments, the method further including calculating a size and orientation of the handwritten character based on the stroke data.

In certain embodiments, the method further includes calculating a horizontal scaling factor of the handwritten character based on the stroke data, wherein storing a character encoding corresponding to the user-specific font character further includes storing the size, orientation, and horizontal scaling factor of the handwritten character. In certain embodiments, the method further includes identifying a user emotion based on the orientation of the handwritten character, and associating the user-specific font character with a specific user-specific font set based on the user emotion.

In some embodiments, the method includes determining a character position of the handwritten character, wherein storing a character encoding corresponding to the user-specific font character further includes generating a file associating the character encoding with the character position and with the user-specific font character. In some embodiments, the method includes displaying a text character indicated by the character encoding using the user-specific font character.

In certain embodiments, mapping the handwritten character to a user-specific font character includes determining a deviation between the stroke data and a user-specific font character matching the handwritten character, and generating a new font character based on the stroke data, in response to the deviation exceeding a character variant threshold. In some embodiments, mapping the handwritten character to a user-specific font character includes determining whether the stroke data of the handwritten character matches a font character of a user-specific font set associated with a user inputting the stroke data, selecting a matching font character, in response to the stroke data matching the font character, and generating a new font character based on the stroke data, in response to the stroke data not matching any font character of the font set.

The computer program product includes a computer readable storage medium that stores code executable by a processor, the executable code comprising code to perform: receiving stroke data from a handwriting input device, identifying one or more handwritten characters from the stroke data, mapping the one or more handwritten characters to at least one user-specific font character, based on the stroke data, and storing, in a file, a character encoding corresponding to the user-specific font character. The computer program product may also include displaying a text character indicated by the character encoding using the user-specific font character.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
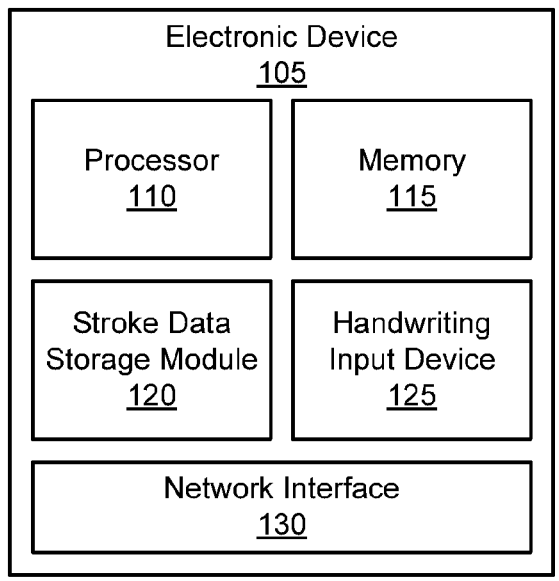
FIG. 1 is a schematic block diagram illustrating one embodiment of a system for reduced storage of user stroke data.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the described embodiments receive user stroke data, map handwritten characters within the stroke data to one or more user-specific font characters, and store a character encoding corresponding to the user-specific font character. Conventionally, stroke data takes large amounts of space due to high sampling rates, resulting in average document size of 10-20 MB. While saving stroke data as animated gif may pack data to achieve exact data bit rate that is received from digitizer pen for a given canvas size, it allows no further compression and also results in large document sizes.

To store the stroke data in a small format a custom user font is created using user's handwriting. Only character encodings referencing the custom user font are stored (e.g., from recognized handwritten characters in the stroke data). When rendering, the stroke data is re-created from the user's font. This reduces storage requirements of handwriting without losing the ability to display it as person's handwriting. In some embodiments, storage requirements are reduced by up to 0.4% of original file size.

Several variants of handwritten characters may be stored in the font and used when handwriting is rendered (randomly or whichever variant fits best). Sometimes the user's handwriting may be different depending on user's mood. Thus, some embodiments may store several user's fonts associated with different moods. Also, different variants of user's handwriting may be used for different character positions in the word or character position relatively to other characters, etc. . . . . For example, some people cross their double t's together so that they look differently than two single t's put together.

To more accurately reproduce the stroke data, differences between stored font stroke data and actual sample data may be store along with the character encodings, their positions, and orientations. Such differences will contain only random deviations from user's handwriting so it will contain less information then stroke data, hence it will result in smaller bit rate then original stroke data and yet be loss less. In the average student example, the storage required for notes will be reduced to 0.5 MB/month or 5 MB/year, which is 0.03% compression rate with preserving of look, feel, character, and individuality of handwritten notes.

FIG. 1 depicts a system 100 for reduced storage of stroke data. The system 100 may include an electronic device 105, itself including a processor 110, a memory 115, a stroke data storage module 120, a handwriting input device 125, and a network interface 130. In some embodiments, the electronic device 105 may be connected to another device, such a server 110, via a data network. The network may be the Internet, a local area network, a wide-area network, a Wi-Fi network, a mobile telephone network, or combinations thereof.

The electronic device 105 may be any digital device capable of receiving a user stroke data, including, but not limited to, a touchpad, a trackpad, a touch screen, and the like. In some embodiments, the electronic device 105 may be an electronic device incorporating a touch panel capable of receiving a multi-touch click action and outputting a click event, including, but not limited to, a mobile phone, a smart phone, a tablet computer, a laptop computer, a desktop computer, a portable gaming console, or the like. In other embodiments, the electronic device 105 may be an electronic device for reduced storage of user stroke data, such as a server or networked storage device receiving and storing notes from user device. The server, in one embodiment, may provide conversion services providing to a user device and/or storage device.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In some embodiments, the processor 110 executes instructions stored in the memory 115 to perform the methods and routines described herein. The processor 110 is communicatively coupled to the memory 115, the stroke data storage module 120, and the handwriting input device 125.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores data relating to converting stroke data, for example, the memory 115 may store user-specific fonts, and the like. In some embodiments, the memory 115 also stores program code and related data, such as an operating system or other controller algorithms operating on the electronic device 105.

The stroke data storage module 120, in one embodiment, is configured to identify a handwritten character from the stroke data, map the handwritten character to a user-specific font character based on the stroke data, and create a file (e.g., a computer-readable file) storing a character encoding corresponding to the handwritten character and the user-specific font character. The stroke data storage module 120 may determine a size, position, orientation, and/or deviation between the handwritten character and a model character, wherein the file further stores the size, position, orientation, and/or deviation.

In some embodiments, the stroke data storage module 120 determines whether the stroke data of the handwritten character matches a font character of a user-specific font set associated with a user inputting the stroke data and either selects a matching font character, in response to the stroke data matching the font character or generates a new font character based on the stroke data, in response to the stroke data not matching any font character of the font set.

In one embodiments, the stroke data storage module 120 may be implemented as a device driver for the handwriting input device 125, providing a software interface to the handwriting input device 125. In another embodiment, the stroke data storage module 120 may be implemented as a controller and/or firmware of the handwriting input device 125.

The handwriting input device 125, in one embodiment, is an input device that receives handwriting input and generates stroke data corresponding to a user's handwriting. In certain embodiments, the handwriting input device 125 comprises a tactile sensor in a writing surface used to translate position and motion into stroke data representative of one or more characters (e.g., letters, symbols, words, etc.). For example, the handwriting input device 125 may include a touch panel, a digitizer, a graphics tablet, a touchpad, a trackpad, or other suitable touch-sensitive writing surface. In certain embodiments, the handwriting input device 125 tracks movement a pen or stylus with which the user inputs (e.g., handwrites) letters, characters, words, and the like. For example, the handwriting input device 125 may include a digital pen (e.g., an active digital pen), a light pen, a stylus, or other pen/stylus movement tracking device.

In some embodiments, the handwriting input device 125 includes an image capture input device used to translate image data into stroke data representative of one or more characters. For example, the handwriting input device 125 may include a scanner, an imager, a digital camera, a camera-based digital pen, or other suitable image capture device. In further embodiments, the handwriting input device 125 may include a combination of a touch-sensitive writing surface, a pen/stylus, and/or an image capture device. In certain embodiments, the handwriting input device 125 may be integrated with a display device, for example, as a touchscreen or similar touch-sensitive display.

Figure 2:
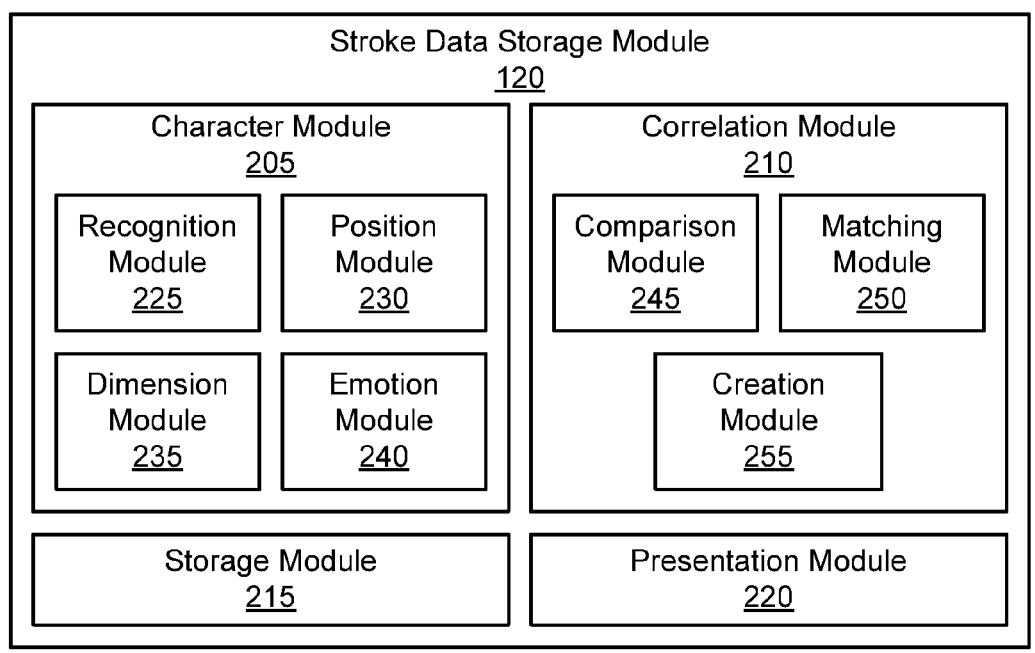
FIG. 2 is a schematic block diagram illustrating one embodiment of an apparatus for reduced storage of user stroke data.

FIG. 2 depicts a stroke data storage apparatus 200 for reduced storage of stroke data. The stroke data storage apparatus 200 may include a stroke data storage module 120 and may be connectively coupled to the handwriting input device 125 that receives input stroke data. As depicted, the stroke data storage module 120 includes a character module 205, a correlation module 210, and a storage module 215. In some embodiments, the stroke data storage apparatus 200 may also include one or more of: a presentation module 220, a recognition module 225, a position module 230, a dimension module 235, an emotion module 240, a comparison module 245, a matching module 250, a creation module 255, and a deletion module 260. The modules 205-260 may be connectively coupled to one another. In certain embodiments, each of the modules 205-260 may be implemented in a hardware circuit, as described above. In other embodiments, one or more of the modules 205-260 may be implemented as firmware and/or software, such as program code embedded on computer readable media, as described above.

The character module 205, in one embodiment, is configured to identify one or more handwritten characters from input stroke data. The handwritten character may be composed of one or more stroke of the input stroke data. In certain embodiments, the character module 205 is communicatively coupled to the handwriting input device 125, wherein the character module 205 receives stroke data from the handwriting input device 125 and/or generates stroke data from inputs measured by the handwriting input device 125. Accordingly, in one embodiment, the character module 205 receives stroke data from the handwriting input device 125, the stroke data comprising user handwriting, and analyzes the stroke data to identify at least one handwritten character. As used herein, a handwritten character refers to a symbol, letter, glyph, mark, icon, logogram, phonograms, or other character composed by the user (e.g., handwritten). Examples of handwritten characters include, but are not limited to, letters, symbols, logograms (e.g., Chinese characters) doodles (e.g., smiley faces or hearts), punctuation marks, and the like.

In certain embodiments, the handwritten character may include two adjacent handwritten letters, wherein the adjacent handwritten letters are represented as a single character. For example, some users cross two adjacent letters "t" with a single line when handwriting, thus a double letter "t" may be represented as a single character. As another example, two adjacent letters "f" may also be represented as a single character. In certain embodiments, two adjacent handwritten letters may be misinterpreted as a single, different handwritten letter. For example, a double lowercase "L" may be misinterpreted as a capital "U," a double lowercase "I" may be misinterpreted as a lowercase "U," and/or a double "V" may be misinterpreted as a "W". However, in these situations, the correlation module 210 maps the misinterpreted character to a user-specific font character matching the handwritten input, as described in greater detail below, thereby mitigating the misinterpretation.

In some embodiments, the character module 205 performs handwriting recognition on the stroke data, determines a character position, size, and orientation of the handwritten character, and/or determines a user motion associated with the handwritten character. In further embodiments, the character module 205 may include one or more submodules, such as the recognition module 225, the position module 230, the dimension module 235, and/or the emotion module 240, for performing these functions. Additionally, in some embodiments, the character module 205 may communicate an identified handwritten character to the correlation module 210 and/or the storage module 215.

The recognition module 225, in one embodiment, is configured to perform handwriting recognition on the stroke data in order to identify one or more handwritten characters from the input stroke data (e.g., input user handwriting). The recognition module 225 may perform any number of handwriting recognition analyses to interpret stroke data. Examples of handwriting recognition analyses include character recognition (e.g., optical character recognition, dynamic character recognition, and/or intelligent character recognition), word recognition, handwriting movement analysis, pattern recognition, and the like. The recognition module 225 may include one or more tools and/or algorithms for performing a handwriting recognition analysis.

In some embodiments, the recognition module 225 segments the stroke data into a plurality of handwritten characters (e.g., letters, symbols, or other characters). In further embodiments, the recognition module 225 may recognize combinations of letters, symbols, and the like with unique handwritten forms, such that the letters of the combination are written differently in the particular combination than when written outside of the combination. For example, some users cross adjacent letters "T" with a single line when handwriting. The recognition module 225 may recognize a double "T" is a unique character. As another example, certain letters, when written in cursive, are written differently when immediately following a letter "O." The recognition module 225 may recognize, as unique characters, each combination of the letter "O" followed by another letter.

In certain embodiments, the recognition module 225 may translate a handwritten character into digital text, such as a text character used by computer. For example, the recognition module 225 may identify a text character matching the handwritten character, based on the handwriting recognition. The digital text, in one embodiment, may be represented using one or more character encodings, wherein each unique character may represented by a unique character encoding corresponding to the identified text character. For example, the recognition module 225 may translate the handwritten character into a Unicode text character encoding, or other character encoding scheme. Where the handwritten character does not match an existing character encoding (e.g., an existing Unicode text character encoding), the recognition module 225 may generate a new encoding to correspond to the handwritten character.

The position module 230, in one embodiment, is configured to determine a character position of the handwritten character. In some embodiments, the character position comprises an on-screen (e.g., displayed) location of the stroke data belonging to the handwritten character. In other embodiments, the character position is a location defined with respect to the handwriting input device 125, for example a pen/stylus coordinate on a writing surface. The character position may indicate a corner or starting point of the handwriting character, the center of the handwriting character, an area encompassed by the handwriting character, or the like.

In certain embodiments, the position module 230 determines the character position of a first letter/character in a word or line of stroke data (e.g., user handwriting). Subsequent letters/characters in the same word/line may be associated with the same character position as the first letter/character. For example, the position module 230 may identifies the character position of a subsequent character with respect to the character position of a previous character.

In some embodiments, the position module 230 may determine the character position with respect to a margin, so as to preserve whitespace of the handwritten text. For example, the character position of a first letter/character in a word or line may indicate a horizontal spacing from a right and/or left margin and a vertical spacing from a top and/or bottom margin. The margin may be a physical margin of the handwriting recognition device 125 or a virtual margin defined by a program receiving the handwritten text (e.g., a note taking application, a handwriting capture application, or the like).

The position module 230, in one embodiment, sends character position data associated with the stroke data to the storage module 215, wherein the storage module 215 stores the character positions, as discussed in further detail below. The presentation module 220, in certain embodiments, accesses the stored character positions to preserve input positions and or spacing when reproducing (e.g., displaying) the user handwriting (e.g., stroke data).

The dimension module 235, in one embodiment, is configured to calculate a size and orientation of the handwritten character using the stroke data. In some embodiments, the size of the handwritten character refers to a font size, for example, a font size of a user-specific font character best fitting the stroke data. In other embodiments, the size of the handwritten character refers to the dimensions of the stroke data (e.g., physical stroke size) corresponding to the handwritten character. In further embodiments, the size of the handwritten character refers to a vertical dimension of the handwritten character. In one embodiment, the size of the handwritten character may be stored by the storage module 215 and used by the presentation module 220 when reproducing the stroke data (e.g., user handwriting).

In some embodiments, the orientation of the handwritten character refers to a slant of the handwritten character, such as the predominant angle of an upward or downward stroke of the handwritten character. The slant may be expressed as an angle from a vertical axis. In other embodiments, the orientation of the handwritten character refers to a skew or shear of the handwritten character. In one embodiment, the orientation of the handwritten character may be stored by the storage module 215 and used by the presentation module 220 when reproducing the stroke data (e.g., user handwriting). In another embodiment, the dimension module 235 may indicate the orientation of the handwritten character to the emotion module 240, wherein the emotion module 240 identifies a user emotion based on the orientation.

In some embodiments, the dimension module 235 calculates a horizontal scaling factor of the handwritten character based on the stroke data. The horizontal scaling factor may be calculated as the ratio of the width of the handwritten character to the width of a reference character, such as a user-specific font character corresponding to the handwritten character. The dimension module 230 may use the horizontal scaling factor in combination with the size of the handwritten character to accurately express both the width and height of the handwritten character. For example, the dimension module 235 may represent a tall, but narrow handwritten character using a size based on the handwritten character's height and a horizontal scaling factor based on the handwritten character's width. In one embodiment, the horizontal scaling factor may be stored by the storage module 215 and used by the presentation module 220 when reproducing the stroke data (e.g., user handwriting).

The emotion module 240, in one embodiment, is configured to identify a user emotion based on physical characteristics and/or patterns of a handwritten character. For example, the motion module 240 may identify user emotion based on the orientation of the handwritten character. Much research has been done showing how emotions are revealed in the physical characteristics and/or patterns of handwriting. For example, the slant (e.g., rightward or leftward) of the user's handwriting may be correlated with an emotion experienced as the user is writing. The motion module 240, in certain embodiments, may examine the physical characteristics and/or patterns of a user's handwriting in order to identify a corresponding emotion.

In some embodiments, the emotion module 240 indicates the identified emotion to the correlation module 210 and/or the storage module 215. The correlation module 210 and/or the storage module 215 may then associate the handwritten character with a particular user-specific font set based on the identified emotion. For example, a plurality of user-specific font sets may be stored for a particular user, wherein each user-specific font set is associated with a particular emotion. In one embodiment, the correlation module 210 may map the handwritten character to a user-specific font character matching the identified emotion. In another embodiment, storage module 215 may store an indication of the emotion associated with a character encoding, such that a user-specific font set associated with the emotion is associated with the character encoding.

The correlation module 210, in one embodiment, is configured to map the one or more handwritten characters with at least one user-specific font character, based on the stroke data. The correlation module 210 receives, from the character module 205, an indication of one or more handwritten characters identified by the character module 205. Additionally, the correlation module 210 sends the character mapping to the storage module 215, in response to mapping the one or more handwritten characters with at least one user-specific font character. In some embodiments, the correlation module 210 translates stroke data into digital text, for example identifying text characters corresponding to the handwritten characters identified by the character module 205. In other embodiments, the character module 205 translates stroke data into digital text and delivers the digital text to the correlation module 210.

As used herein, a user-specific font character refers to a character of a user-specific computer font. The user-specific computer font may be a custom computer font based on the user's handwriting. The user-specific computer font comprises a plurality of font characters, each font character indicating a style in which a text character is represented and/or displayed. In certain embodiments, the handwritten character may include two adjacent handwritten letters, wherein mapping the handwritten character to a user-specific font character comprises generating a single user-specific font character representing the two adjacent handwritten letters.

In one embodiment, the correlation module 210 compares the stroke data to a plurality of user-specific font characters in order to find a font character best matching the handwritten character. In one embodiment, the correlation module 210 generates a new user-specific font character based on the stroke data if no best match is found. Accordingly, the correlation module 210 may dynamically generate the user-specific computer font, in response to the stroke data storage module 120 receiving additional stroke data from the handwriting input device 125.

In another embodiment, the correlation module 210 may determine a deviation between the stroke data and a reference character, such as an existing user-specific font character. If the deviation exceeds a character variant threshold, the correlation module 210 may generate a new user-specific fund character. Otherwise, the correlation module 210 may select a user-specific font character having the lowest deviation from the stroke data. In response to mapping a handwritten character to a user-specific font character, the correlation module 201 may delete the stroke data corresponding to the handwritten character. In certain embodiments, the correlation module 210 may include one or more submodules, such as the comparison module 245, the matching module 250, the creation module 255, and/or the deletion module 260 for performing the above functions.

The comparison module 245, in one embodiment, is configured to determine whether the stroke data of the handwritten character matches a font character. In some embodiments, the font character belongs to a user-specific font set associated with a user inputting the stroke data. In certain embodiments, determining whether the stroke data of the handwritten character matches a font character includes the comparison module 245 comparing dimensions (e.g., height and/or width), line thickness, orientation, or the like, between the stroke data (belonging to the handwritten character) and the font character.

In some embodiments, comparing the stroke data to a font character may include the comparison module 245 identifying deviations between the stroke data (e.g., the handwritten character) and the font character. For example, the comparison module 245 may compare lines, curves, corners, intersections, or other features of the stroke data to features of a model (e.g., reference) character, such as the font character. In certain embodiments, the deviations are stored to file so as to better reproduce the user's handwriting (e.g., stroke data) by modifying the font character based on the store deviations, as discussed in greater detail below.

Where corresponding features exist in both the stroke data and the font character, the comparison module 245 may identify deviations between the stroke data features and the font character features. In one embodiment, the correlation module 210 may select a best fitting (e.g., closest match) font character based on the feature comparison. In another embodiment, the correlation module 210 may generate a new fund character if the deviations exceed a character variant threshold. Where corresponding features do not exist, the correlation module 210 may eliminate the font character as a candidate matching character and either examine another font character or generate a new font character based on the stroke data.

In certain embodiments, the user-specific font set may include a two or more variants of a text character (e.g., a letter), each variant having its own character encoding. For example, the user-specific font set may include multiple versions of a letter to capture variations in handwriting between the same letter when used at the beginning, middle, and/or end of a word. As another example, the user-specific font set may include multiple versions of a letter to capture variations in user emotion when handwriting. Accordingly, in one embodiment, the comparison module 245 may compare the stroke data to multiple font characters belonging to different variants of the same letter, wherein the correlation module 210 selects a best fitting variant based on the comparison.

The matching module 250, in one embodiment, is configured to determine whether the stroke data of the handwritten character matches a font character of a user-specific font set associated with a user inputting the stroke data. For example, the matching module 250 may use data received from the comparison module 245 in determining whether the stroke data matches a font character. In some embodiments, the matching module 250 determines whether the stroke data matches one of a plurality of candidate font characters. In one embodiment, the matching module 250 determines that the stroke data does not match a candidate font character if the stroke data includes character features (such as lines, curves, corners, intersections, or other marks) missing in a font character.

In some embodiments, the matching module 250 is used to dynamically generate new font characters of the user-specific font set, wherein new font characters are generated in response to the stroke data being sufficiently different (e.g., not closely matching) existing font characters in the user-specific font set. As such, the matching module 250 may reference one or more character variant thresholds when determining whether the stroke data matches an existing font character. In further embodiments, the matching module 250 may identifying a text character and/or character encoding for a letter/character variant matching the stroke data (e.g., handwritten character), the character encoding indicating the particular variant. Where the handwritten character does not match an existing character encoding (e.g., an existing Unicode text character encoding), the matching module 250 may generate a new encoding to correspond to the handwritten character. Examples of handwritten characters without pre-existing character encoding include, but are not limited to, character combinations (e.g., a double "T"), icons, and doodles (e.g., hearts). Further, the matching module 250 and/or the correlation module 210 may generate a new character encoding upon identifying a new letter/character variant of an existing character encoding.

In certain embodiments, the matching module 250 is further configured to select a best matching font character from the user-specific font set that matches the handwritten character, wherein the storage module 215 stores a character encoding of the selected user-specific font character. For example, the matching module 250 may select a preexisting user-specific font character having a smallest deviation from the stroke data. In some embodiments, the matching module 250 selects the best matching font character in response to the deviation being below a character variant threshold. Otherwise, if the deviation is above the character variant threshold, then the correlation module 210 determines that the handwritten character is a new character, or a new variant of an existing font character, and the creation module 255 generates a new font character. In some embodiments, the matching module 250 indicates to the deletion module 260 that a user-specific font character has been selected, wherein the deletion module 260 erases the stroke data used to select user-specific font character.

The creation module 255, in one embodiment, is configured to generate a new font character based on the stroke data. The creation module 255 is capable of dynamically generating new font characters from the stroke data if existing font characters are not suitable matches for the stroke data. For example, the creation module 255 may generate a new font character in response to the matching module 250 determining that the stroke data does not match any existing in a user-specific font set. As another example, the creation module 255 may generate a new font character in response to the comparison module 245 determining that deviations between the stroke data and existing font characters of the user-specific font set exceed a predetermined threshold, such as the character variant threshold discussed above. In yet another example, the character module 205 may detect that there is a similar object drawn over and over again (such as where the user likes to draw hearts) wherein the creation module 255 may generate a custom character corresponding to the object.

In some embodiments, the creation module 255 generates a bitmap font character using the stroke data. In other embodiments, the creation module 255 generates a vector font character (e.g., an outline or a stroke-based font character) using the stroke data. For example, the creation module 255 may generate the vector font character by defining a set of vertices and lines/curves between the vertices that follows the stroke data received from the handwriting input device 125. In some embodiments, the creation module 255 indicates to the deletion module 260 that the new font character has been generated, wherein the deletion module 260 erases the stroke data used to generate the new font character.

The deletion module 260, in one embodiment, is configured to erase stroke data in response to the mapping the handwritten character to a user-specific font character based on the stroke data. In some embodiments, the deletion module 260 erases stroke data corresponding to a handwritten character in response to matching module 250 successfully matching the stroke data to a user-specific font character of the user-specific font set. In other embodiments, the deletion module 260 may erase stroke data corresponding to a handwritten character in response to the creation module 255 generating a new user-specific font character based on the stroke data. In a further embodiment, the deletion module 260 may wait to delete the stroke data until the storage module 215 stores a character encoding corresponding to the user-specific font character selected and/or generated based on the stroke data.

The storage module 215, in one embodiment, is configured store a character encoding corresponding to the user-specific font character. The storage module 215 may store the character encoding in response to information received from the character module 205 and the correlation module 210. In some embodiments, the storage module 215 stores the character encoding by creating a file (e.g., a computer-readable file) storing a character encoding corresponding to the handwritten character and the user-specific font character. For example, the storage module 215 may create a text file storing the character encodings, thereby storing the text (e.g., sequence of letters/characters) embodied in the stroke data. The text file may be later read by the presentation module 220, or by another device and/or application, so as to reproduce the stroke data. In some embodiments, the storage module 215 indicates to the deletion module 260 that the character encoding has been stored, wherein the deletion module 260 erases stroke data associated with the character encoding (e.g., stroke data corresponding to the handwritten character mapped by user-specific font character indicated by the character encoding).

As discussed above, in certain embodiments, a single letter, character, or symbol may be associated with a plurality of character variants. In some embodiments, the user may handwrite a first variant when using the letter/character in a first context (e.g., character combination) and handwrite a second variant in a second context, as discussed below. In one embodiment, the character encoding indicates which variant is to be used among a plurality of variants of a single letter/character. Each character encoding may be associated with a different font character, wherein the font set includes a plurality of font characters for the different variants of a text character. In another embodiment, deviation data is stored, wherein the font character indicated by the character encoding is modified based on the deviation data to replicate the variants of a single letter, character, or symbol.

The storage module 215 may further store additional information, such as position, orientation, size (including horizontal scaling factor), deviation from a reference character, and the like, relating to the handwritten character. For example, the text file including the character encodings may also include position, orientation, size, and/or deviation data for the character encodings. In further embodiments, the position, orientation, and/or size, may relate to a grouping of character encodings, such as a word, line, or paragraph. For example, all characters in a word may have the same size and orientation (e.g., slant), wherein the stored position information indicates the start of the word.

In some embodiments, the storage module 215 is configured to store a font file containing the user-specific font. In certain embodiments, the font file may be part of a user profile for the user inputting the stroke data. In one embodiment, the storage module 215 stores the font file on a networked storage device, such as a server, so that the font file may be shared across a plurality of devices used by the same user. In some embodiments, the font file is associated with the text file, such that the text file, when displayed, is always shown using the author's specific font set. For example, the font file may be embedded within the text file. As another example, the font file may be a shared file on a publically accessible server, such that a third-party reading/displaying the text file may access the font file associated with the text file's author.

In some embodiments, a plurality of user-specific fonts are created, each font associated with a particular user emotion as described above. Thus, in certain embodiments, the storage module 215 is further configured to store a particular user-specific font character in a particular font file based on a user emotion identified by the emotion module 240, wherein all font characters in the particular font file are associated with the same user emotion. The storage module 215 may additionally store in the text file, an indication of the user emotion associated with the character encoding, thereby ensuring that the proper font file is associated with the text.

As described, the stroke data storage apparatus 200 effectively creates a new file using the stroke data, thereby reducing the space needed to store the handwriting embodied in the stroke data. Accordingly, in one embodiment the stroke data is discarded after the storage module 215 creates the text file and/or the font file. Thus, the stroke data storage apparatus 200 converts the raw stroke data into a compact file comprising the text of the stroke data and a user-specific, custom font set for displaying the text, the user-specific font set being created from the stroke data. Accordingly, in some embodiments, stroke data storage apparatus 200 reduce storage size of the stroke data by up to 0.4% of original file size.

The presentation module 220, in one embodiment, is configured to display a text character indicated by the character encoding using the user-specific font character. In some embodiments, the presentation module 220 reads a file (e.g., a computer-readable file) comprising one or more character encodings that reference a user-specific font set and displays a text character indicated by the character encoding, using the user-specific font character. In certain embodiments, the file includes a font file comprising the user-specific font characters.

In some embodiments, the presentation module 220 loads a custom font based on a user associated with the file (e.g., an author of the file). For example, an author identifier may be stored as metadata of the file, wherein the presentation module 220 loads a user-specific font file based on the author identifier, the user-specific font file containing a custom font set generated using stroke data from the author.

In certain embodiments, the presentation module 220 identifies position, orientation, size, width, and/or other character information for the text character from the file. The presentation module 220 may then display the text character at the indicated on-screen location and with the indicated orientation, size, width, etc. Thus, the presentation module 220 reproduces the stroke data by displaying the text character at the position of the input (e.g., handwritten) character using the user-specific font character (derived from the stroke data) and the orientation, size, width, etc. of the input character. In this way, the presentation module 220 may replicate handwritten notes, documents, or other compositions using far less computer storage space than traditional methods of storing compressed stroke data or images of the stroke data.

FIGS. 3A-3E depict embodiments of a note taking system 300 for reduced storage of stroke data. The note taking system 300, in one embodiment, may include a mobile device 302 and a stylus 310. In some embodiments, the mobile device 302 includes a stroke data storage module 120, described above with reference to FIGS. 1 and 2. In one embodiment, the mobile device 302 may be substantially similar to the electronic device 105 described above with reference to FIG. 1. The mobile device 302 includes a display 304 capable of displaying stroke data corresponding to user input. The mobile device 302 may then convert and store the stroke data, as discussed in further detail below.

In some embodiments, the stylus 310 is a passive stylus used for writing on the display 304. Accordingly, the display 304 may include a digitizing touchscreen display that converts strokes of the stylus 310 across the display 304 into stroke data. In other embodiments, the stylus 310 is an active stylus that measures the stroke data via optical, inertia, or other sensor as the stylus 310 move with respect to the mobile device 302. The stylus 310 may communicate the measured stroke data to the mobile device 302, wherein the mobile device 302 converts and stores the stroke data, as discussed in further detail below.

Figure 3A:
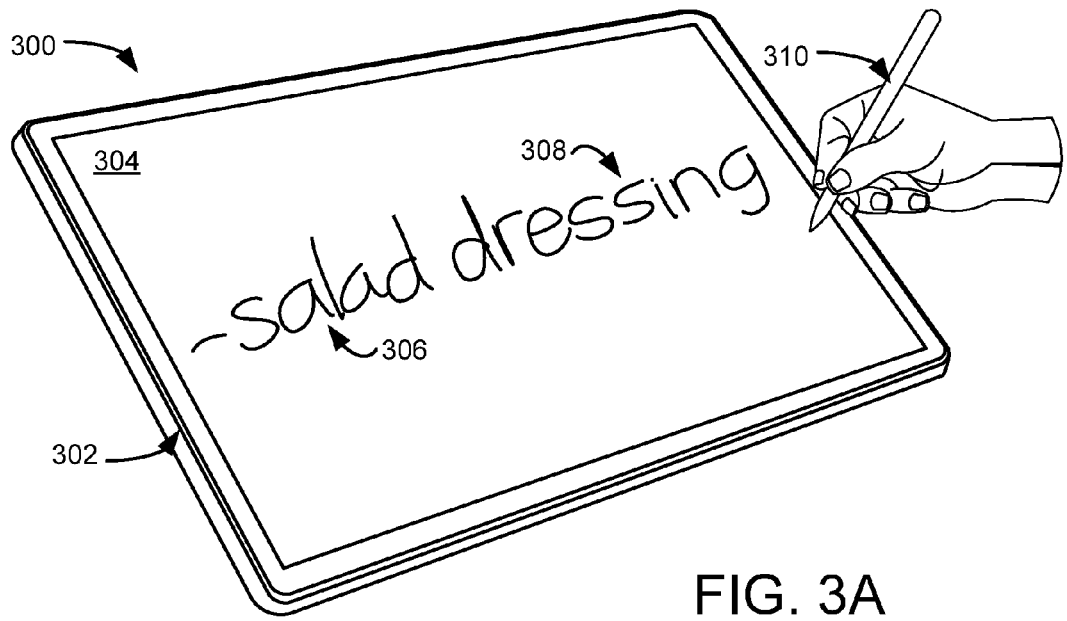
FIG. 3A is a schematic block diagram illustrating one embodiment of a mobile device receiving user stroke data.

FIG. 3A is a schematic block diagram illustrating one embodiment of the note taking system 300 receiving stroke data. In some embodiments, the stroke data comprises at least a first handwritten word 306 and a second handwritten word 308. While the stroke data may comprise any number of words, lines, paragraphs, or the like, only two words are shown here for the sake of simplicity. The stroke data may result from the user writing on the display 304 with the stylus 310. As depicted, the user has written "-salad dressing."

Figure 3B:
FIG. 3B is a schematic block diagram illustrating one embodiment of a word of user stroke data.

FIG. 3B is a schematic block diagram illustrating one embodiment of a first handwritten word 306. As depicted, the user has written the word "salad" as well as a symbol character 312 (a hyphen mark). The first handwritten word 306 includes five characters, a first character 314 ("s"), a second character 316 ("a"), a third character 318 ("l"), a fourth character 320 ("a"), and a fifth character 322 ("d"). As depicted, the second character 316 and the fourth character 320 correspond to the same text letter ("a"), however, each letter is written differently. In some embodiments, the mobile device 302 may map both the second character 316 and the fourth character 320 to the same user-specific font character. In other embodiments, the mobile device 302 may map the second character 316 and the fourth character 320 to different variants of the same character (the letter "a") due to their differences.

Figure 3C:
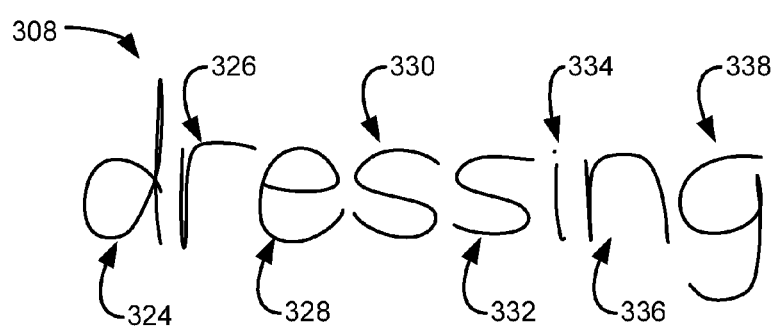
FIG. 3C is a schematic block diagram illustrating another embodiment of a word of user stroke data.

FIG. 3C is a schematic block diagram illustrating one embodiment of a second handwritten word 308. As depicted, the user has written the word "dressing." The second handwritten word 308 includes eight characters, a first character 324 ("d"), a second character 326 ("r"), a third character 328 ("e"), a fourth character 330 ("s"), a fifth character 332 ("s"), a sixth character 334 ("i"), a seventh character 336 ("n"), and an eighth character ("g"). As depicted, the fourth character 330 and the fifth character 332 correspond to the same text letter ("s"), however, each letter is written differently. Additionally, the fourth character 330 and the fifth character 332 correspond to the same text letter as the first character 314, while the fifth character 322 of the first handwritten word 306 and the first character 324 of the second handwritten word 308 correspond to the same letter ("d"). In some embodiments, the mobile device 302 may map all handwritten characters corresponding to the same text letter to the same user-specific font character. In other embodiments, the mobile device 302 may map one or more handwritten characters corresponding to the same text letter to different variants of the same character due to their differences.

Figure 3D:
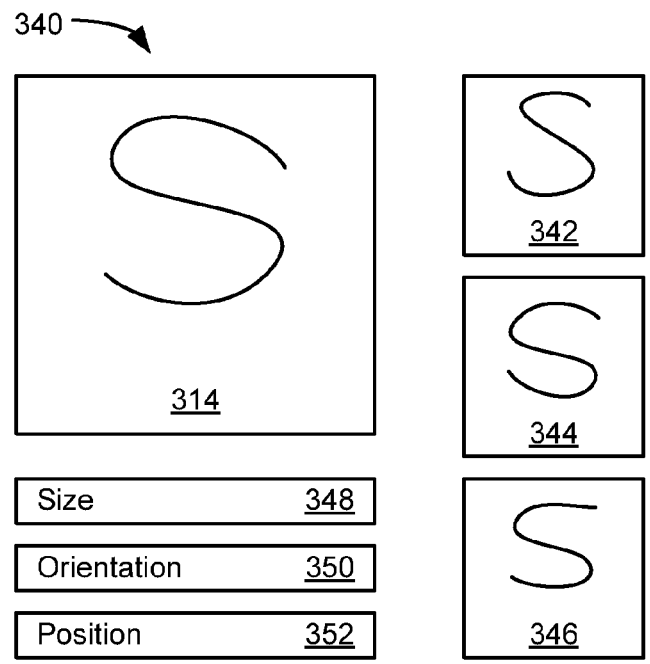
FIG. 3D is a schematic block diagram illustrating one embodiment of stroke data analysis.

FIG. 3D is a schematic block diagram illustrating one embodiment of stroke data analysis 340. As depicted, the first character 314 is compared to three candidate font characters 342-346 selected from a user-specific font set. In some embodiments, the candidate font characters are selected by identifying existing font characters with features (e.g., lines, curves, vertices, intersections, etc.) similar to the input handwritten character (e.g., the first character 314). Each of the candidate font characters 342-346 exists in the user-specific font set at the time of the stroke data analysis 340. The user-specific font set is dynamically generated from stroke data input from the user. As depicted, each of the candidate font characters 342-346 is a variant of the same text letter ("s"). While three variants are shown in the depicted embodiment, in other embodiments any number of variants may be included in the user-specific font set.

In some embodiments, the mobile device 302 identifies deviations among the similar features of the first character 314 and a candidate font character 342-346. For example, the mobile device 302 may identify differences in starting and/or ending points between the first character 314 and the first candidate character 342. In another example, the mobile device 302 may determine a curve deviation between the first character 314 and the second candidate character 344 or the third candidate character 346.

Based on the comparison, the mobile device 302 may select a best matching font character. For example, the mobile device 302 may determine that the first character 314 deviates the least from the second candidate character 344, thereby selecting the second candidate character 344 as the best matching font character. In a further embodiment, the mobile device 302 may compare the deviations to a threshold, such as the character variant threshold discussed above, wherein, in response to the deviations exceeding the threshold, the mobile device 302 does not select a candidate character, but instead generates a new font character from the stroke data.

In response to identifying a best matching font character (or generating a new font character), the mobile device 302 determines a character encoding associated with the font character. The mobile device 302 may then store the character encoding, thereby enabling later reproduction of the stroke data using the character encodings associated with the handwritten characters. In certain embodiments, the mobile device 302 additionally identifies and stores a size 348, orientation (e.g., slant) 350, and/or position 352 of the first character 314 for accurate reproduction of the stroke data.

Figure 3E:
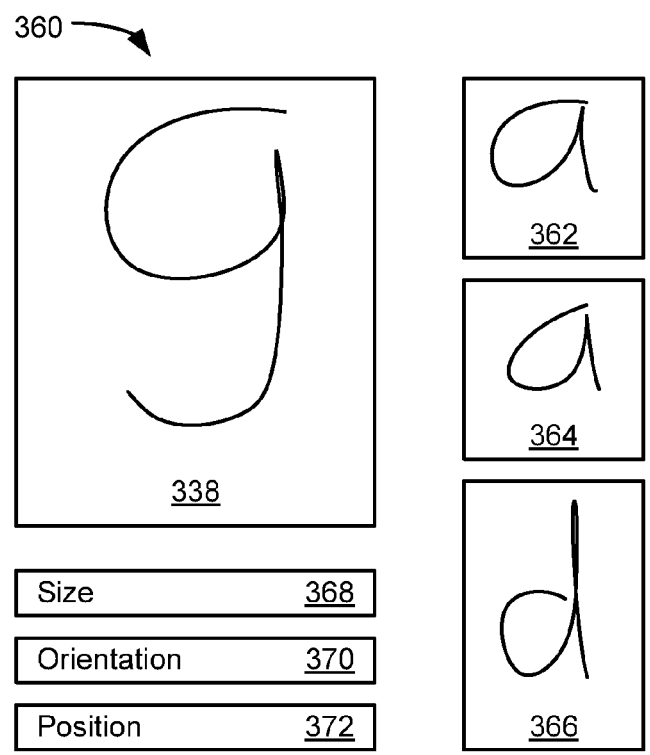
FIG. 3E is a schematic block diagram illustrating another embodiment of stroke data analysis.

FIG. 3E is a schematic block diagram illustrating another embodiment of stroke data analysis 360. As depicted, the eighth character 338 is compared to three candidate font characters 362-366 selected from a user-specific font set. Each of the candidate font characters 362-366 is generated from stroke data associated with the user. In some embodiments, the candidate font characters are selected by identifying existing font characters with features (e.g., lines, curves, vertices, intersections, etc.) similar to the input handwritten character (e.g., the eighth character 338). As depicted, a font character corresponding to the letter "g" does not yet exist within the user-specific font set. However, in the described embodiments, the mobile device 302 dynamically expands (e.g., adds to) the user-specific font set each time a handwritten character is analyzed that does not match an existing font character.

In some embodiments, the mobile device 302 identifies deviations among the similar features of the eighth character 338 and a candidate font character 362-366. For example, the mobile device 302 may identify differences in starting and/or ending points between the eighth character 338 and the first candidate character 362. In another example, the mobile device 302 may determine a curve deviation and/or vertex deviation between the eighth character 338 and the second candidate character 364 or the third candidate character 366. Based on the comparison, the mobile device 302 may determine that no candidate character matches the eighth character 338. In one embodiment, the mobile device 302 may identify that the eighth character 338 deviates from the candidate characters 362-366 beyond a threshold amount.

In response to determining that the second candidate character 344 does not match any candidates, the mobile device 302 may generate a new font character based on the stroke data and add this new font character to the user-specific font set. As depicted, the mobile device 302 adds a font character corresponding to a newly encountered text character. With the passage of time, fewer new entries will be added to the user-specific font set. The user-specific font set may be stored in a computer-readable font file.

In some embodiments, the user may control the size of the font file associated with the user-specific font by adjusting the character variant threshold. A high threshold results in few variants of the same letter, while a low threshold results in many variants of the same letter. Alternatively, the character variant threshold may be determined based on a font file size preference of the user, wherein a preference for smaller files (or for lower quality stroke data reproduction) results in a higher threshold, while a preference for larger files (or for higher quality stroke data reproduction) results in a lower threshold. In some embodiments, the user may be prompted for a font file size preference and/or a reproduction quality preference.

Having generated the new font character, the mobile device 302 generates a character encoding for with the font character. The mobile device 302 may then store the character encoding, thereby enabling later reproduction of the stroke data using the character encodings associated with the handwritten characters. In certain embodiments, the mobile device 302 additionally identifies and stores a size 368, orientation (e.g., slant) 370, and/or position 372 of the eighth character 338 for accurate reproduction of the stroke data.

Figure 4A:
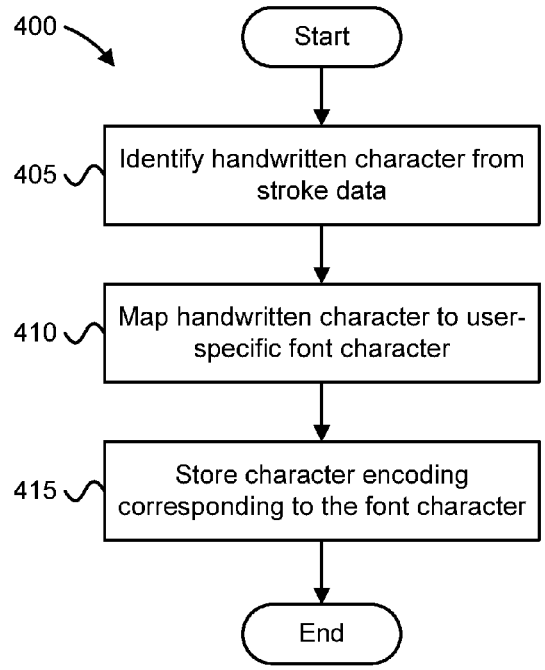
FIG. 4A is a flow chart diagram illustrating one embodiment of a method for reduced storage of stroke data.

FIG. 4A is a flow chart diagram illustrating one embodiment of a method 400 for reduced storage of stroke data. In one embodiment, the method 400 is performed by the electronic device 105. In another embodiment, the method 400 may be performed by the stroke data storage apparatus 200. Alternatively, the method 400 may be performed by a computer readable storage medium, such as the memory 115. The computer readable storage medium may store code that is executed on the processor 110 to perform the functions of the method 400.

The method 400 begins and the character module 205 identifies 405 the handwritten character from stroke data. In some embodiments, the stroke data is received by the character module 205 from an input device, such as the handwriting input device 125, wherein the stroke data comprises one or more handwritten strokes forming the handwritten character. In certain embodiments, the character module 205 identifies 405 a plurality of handwritten characters within the stroke data. For example, the stroke data may correspond to a letter, a word, a line, a paragraph, or other unit of handwriting.

In some embodiments, identifying 405 the handwritten character further includes translating the handwritten character to a text character. For example, the character module 205 may perform an optical character recognition algorithm, or similar character recognition algorithm, to the stroke data in order to identify the handwritten character. In certain embodiments, identifying 405 the handwritten character includes segmenting stroke data into a plurality of handwritten characters and translating each handwritten character. In further embodiments, identifying 405 the handwritten character may include identifying a size, position, and/or orientation of the handwritten character.

The correlation module 210 then maps 410 the handwritten character to a user-specific font character based on the stroke data. Mapping 410 the handwritten character to a user-specific font character may include identifying a plurality features (such as lines, curves, corners, and/or intersections) within the handwritten character and identifying a plurality of candidate font characters having similar features, the candidate font characters belonging to a user-specific font set. The correlation module 210 may then select a best matching user-specific font character from the plurality of candidate font characters.

In one embodiment, the mapping 410 the handwritten character to a user-specific font character may include determining a variation between the stroke data and one or more reference characters, such as a candidate font character. A candidate font character having the smallest variation may then be selected as the best matching user-specific font character. In some embodiments, the amount of variation may be compared to a character variant threshold, wherein the correlation module 210 generates a new user-specific font character (e.g., a new variant of the handwritten character) in response to the variation exceeding the character variant threshold.

The storage module 215 then stores 415 a character encoding corresponding to the user-specific font character. In one embodiment, the character encoding corresponds to an identified text character corresponding to the handwritten character. In certain embodiments, the storage module 215 creates a file storing 415 the character encoding. For example, the storage module 215 may create a text file including text characters, translated from the handwritten stroke data, and corresponding user-specific font characters, wherein the text characters are to be displayed using the user-specific font characters in order to reproduce the stroke data. In some embodiments, storing 415 the character encoding includes storing size, position, and/or orientation data for the handwritten character corresponding to the character encoding. The method 400 ends.

Figure 4B:
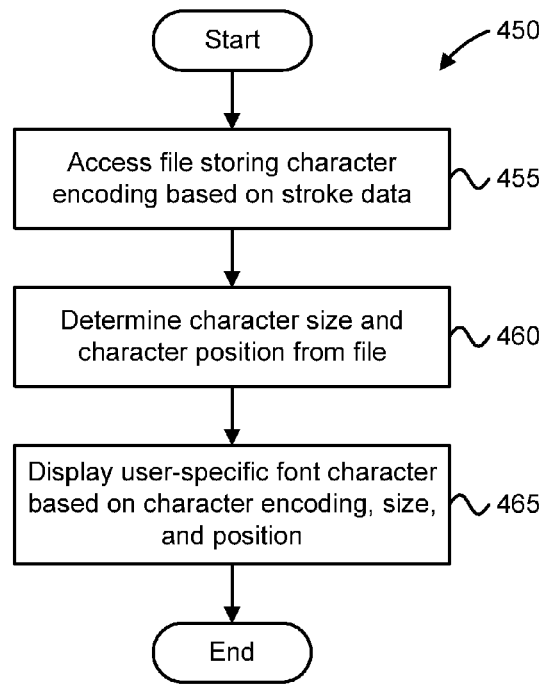
FIG. 4B is a flow chart diagram illustrating one embodiment of a method for reproducing stroke data.

FIG. 4B is a flow chart diagram illustrating one embodiment of a method 450 for reproducing stroke data. In one embodiment, the method 450 is performed by the electronic device 105. In another embodiment, the method 450 may be performed by the stroke data storage apparatus 200. Alternatively, the method 450 may be performed by a computer readable storage medium, such as the memory 115. The computer readable storage medium may store code that is executed on the processor 110 to perform the functions of the method 450.

The method 450 begins and the presentation module 220 accesses 455 a file storing character encodings based on input stroke data. In one embodiment, the character encoding indicates a user-specific font character, the user-specific font character being based on the input stroke data. In another embodiment, the file indicates a user-specific font set to be used with the stored character encodings. The presentation module 220 then determines 460 a character size and a character position from the file. In some embodiments, the character size and a character position are the same for each character in a word, line, or paragraph.

The presentation module 220 displays 465 a user-specific font character based on the character encoding, character size, and character position of the file. In one embodiment, each character encoding indicates a particular user-specific font character. In a further embodiment, a text character may be mapped to a plurality of user-specific font characters, wherein the character encoding indicates a particular variant of the text character that best matches the stroke data. The method 450 ends.

Figure 5:
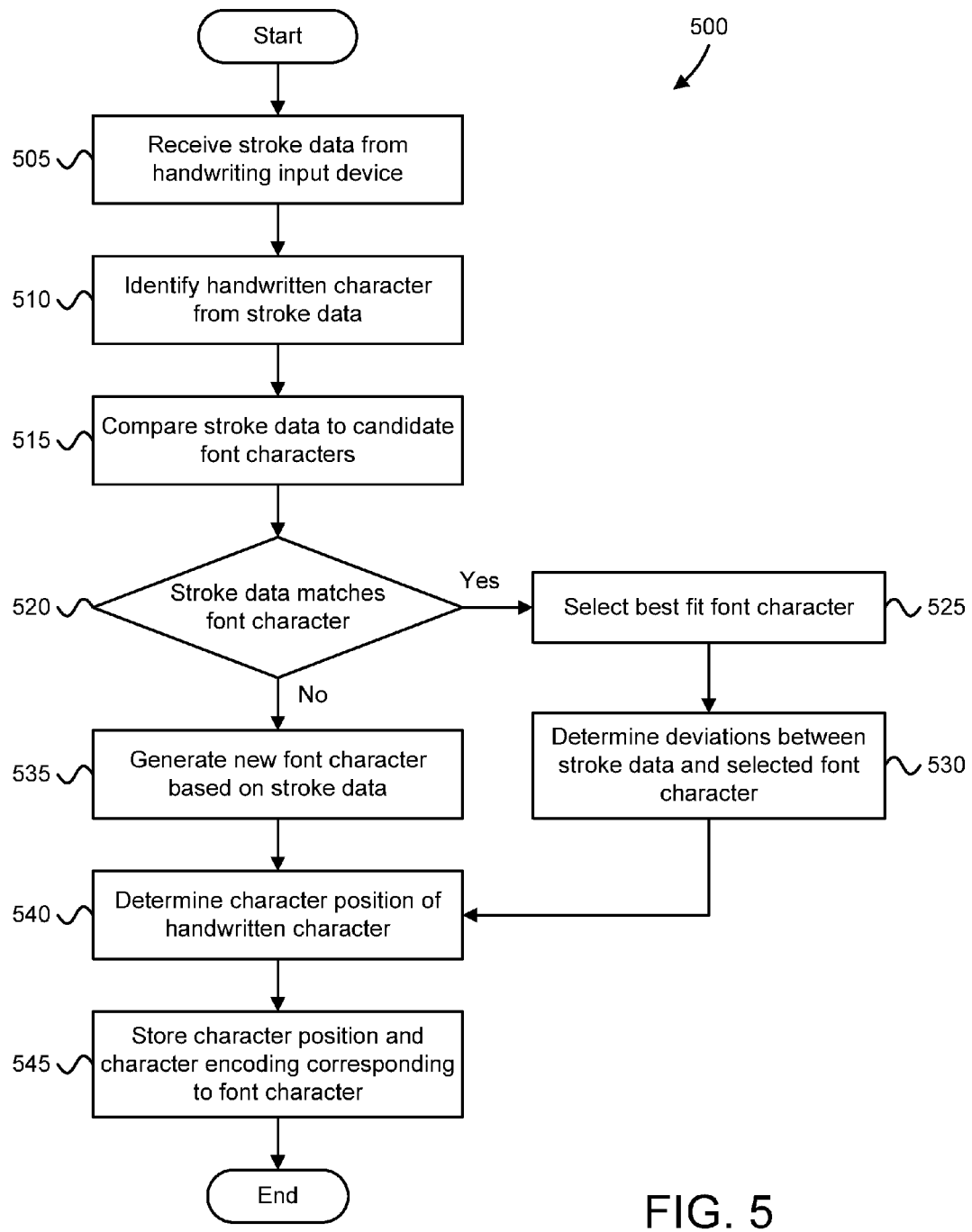
FIG. 5 is a schematic flow chart diagram illustrating one embodiment of a method for reduced storage of stroke data.

FIG. 5 is a schematic flow chart diagram illustrating one embodiment of a method 500 for reduced storage of stroke data. In one embodiment, the method 500 is performed by the electronic device 105. In another embodiment, the method 500 may be performed by the stroke data storage apparatus 200. Alternatively, the method 500 may be performed by a computer readable storage medium, such as the memory 115. The computer readable storage medium may store code that is executed on the processor 110 to perform the functions of the method 500.

The method 500 begins and the character module 205 receives 505 stroke data from a handwriting input device 125. The character module 205 identifies 510 one or more handwritten characters from the stroke data. For example, the stroke data may correspond to a letter, a word, a line, a paragraph, or other unit of handwriting. In certain embodiments, identifying 510 the handwritten character includes segmenting stroke data into a plurality of handwritten characters and translating each handwritten character. In some embodiments, identifying 510 the handwritten character further includes translating the handwritten character to a text character.

The comparison module 245 compares 515 stroke data to one or more font characters of a user-specific font set. In one embodiment, comparing 515 stroke data to one or more font characters includes identifying a plurality features (such as lines, curves, corners, and/or intersections) within the handwritten character and identifying a plurality of candidate font characters having similar features, the candidate font characters belonging to the user-specific font set. In a further embodiment, comparing 515 stroke data to one or more font characters includes determining a variation between the stroke data and the one or more font characters.

The matching module 250 determines 520 whether the stroke data matches a candidate font character. In one embodiment, determining 520 whether the stroke data matches a font character includes determining whether the handwritten character and the candidate font character have matching character features (e.g., lines, curves, corners, and/or intersections). In another embodiment, determining 520 whether the stroke data matches a font character, includes determining whether the variation between the stroke data and the candidate font character is below a character variant threshold. For example, if the variation exceeds the character variant threshold for all candidate font characters, then the matching module 250 may determine 520 that no font character matches the stroke data.

In response to the matching module 250 determining 520 that the stroke data matches a font character, the correlation module 210 selects 525 a best fitting font character. Otherwise, in response to the matching module 250 determining 520 that the stroke data does not match a font character, the creation module 255 generates 535 a new font character based on the stroke data. In some embodiments, generating 535 the new font character includes defining a set of vertices and lines/curves between the vertices that follows the stroke data. In a further embodiment, generating 535 the new font character may include defining a new character encoding corresponding to the new font character.

In some embodiments, selecting 525 the best fit font character includes identifying a lowest variation between the stroke data and the candidate font characters and selecting the font character corresponding to the lowest variation. In response to selecting 525 the best fit font character, the comparison module 245 may determine 530 deviations between the stroke data in the selected font character. Deviations may include differences in orientation, differences in size, differences in character feature location, and/or differences in stroke length. The character module 205 may determine 540 a character position of the handwritten character in response to either selecting 525 the best fit font character or generating 535 a new font character.

The storage module 215 stores 545 the character position and a character encoding corresponding to the font character. In one embodiment, the character encoding corresponds to an identified text character corresponding to the handwritten character. In certain embodiments, the storage module 215 creates a file storing 545 the character encoding. For example, the storage module 215 may create a text file including both text characters translated from the handwritten stroke data and corresponding user-specific font characters, wherein the text characters are to be displayed using the user-specific font characters in order to reproduce the stroke data. In some embodiments, storing 545 the character position and character encoding includes storing size and/or orientation data for the handwritten character corresponding to the character encoding. The method 500 ends.

Figure 6:
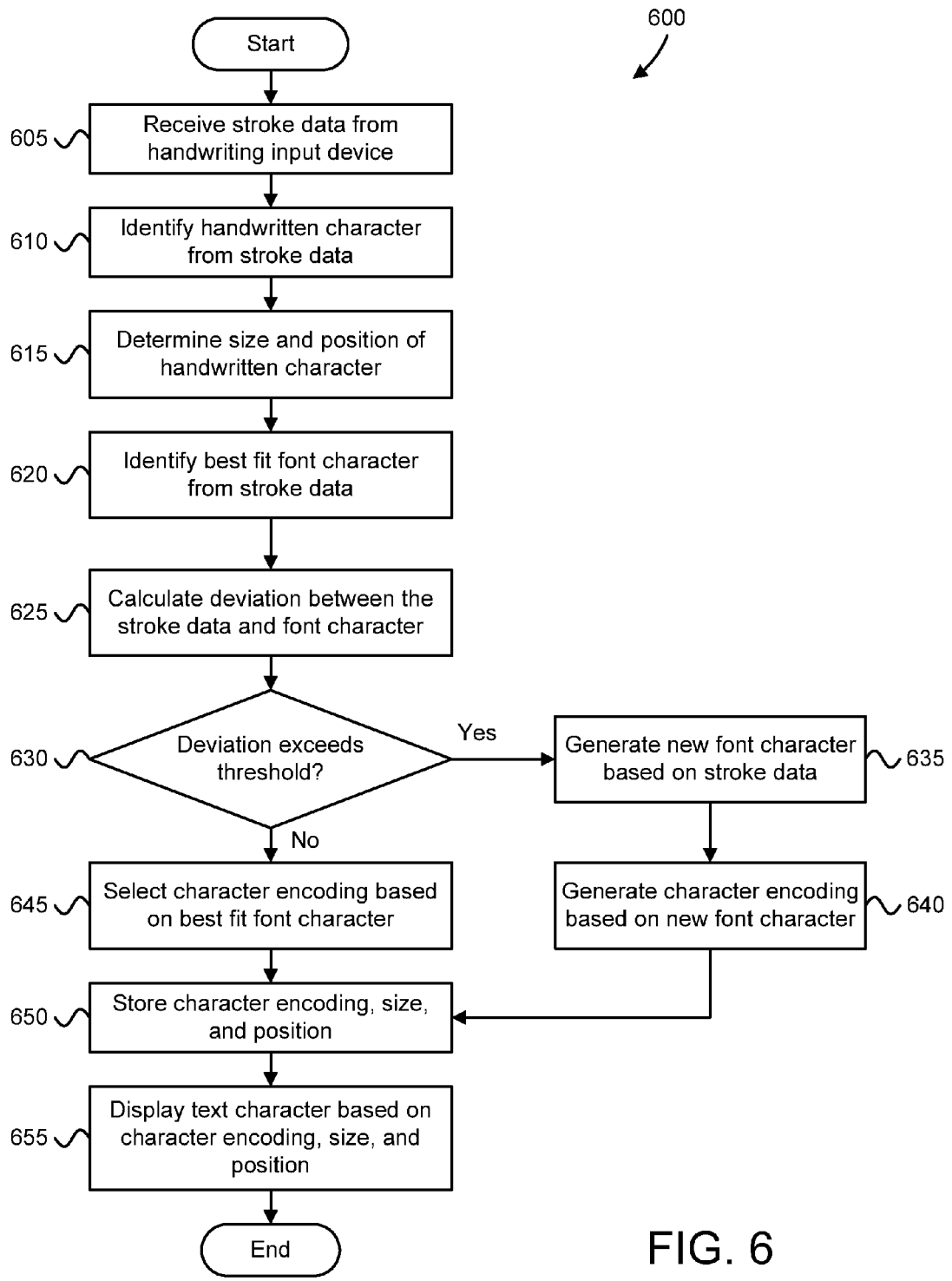
FIG. 6 is a schematic flow chart diagram illustrating another embodiment of a method for storing and reproducing stroke data.

FIG. 6 is a schematic flow chart diagram illustrating another embodiment of a method 600 for storing and reproducing stroke data. In one embodiment, the method 600 is performed by the electronic device 105. In another embodiment, the method 600 may be performed by the stroke data storage apparatus 200. Alternatively, the method 600 may be performed by a computer readable storage medium, such as the memory 115. The computer readable storage medium may store code that is executed on the processor 110 to perform the functions of the method 600.

The method 600 begins and the character module 205 receives 605 stroke data from a handwriting input device 125. The character module 205 identifies 610 one or more handwritten characters from the stroke data. For example, the stroke data may correspond to a letter, a word, a line, a paragraph, or other unit of handwriting. In certain embodiments, identifying 610 the handwritten character includes segmenting stroke data into a plurality of handwritten characters and translating each handwritten character. In some embodiments, identifying 610 the handwritten character further includes translating the handwritten character into a text character, for example using a character recognition algorithm.

The character module 205 may determine 615 the size and position of the handwritten character. In further embodiments, the character module 205 may also determine a slant or orientation of the handwritten character. The matching module 250 identifies 620 a best fit font character from a user-specific font set based on the stroke data. In some embodiments, identifying 620 the best fit font character includes comparing the stroke data to one or more font characters of the user-specific font set.

The comparison module 245 calculates 625 a deviation between the stroke data and the best fit font character and the correlation module 210 determines 630 whether the deviation exceeds a character variant threshold. Deviations may include differences in orientation, differences in size, differences in character feature location, and/or differences in stroke length. In response to the correlation module 210 determining 630 that the deviation exceeds the threshold, the creation module 255 generates 635 a new font character based on the stroke data. Otherwise, in response to the correlation module 210 determining 630 that the deviation does not exceed the threshold, the correlation module 210 selects 645 a character encoding corresponding to the best fit font character.

In some embodiments, generating 635 the new font character includes defining a set of vertices and lines/curves between the vertices that follows the stroke data. In other embodiments, generating 635 the new font character includes creating a bitmap font character from the stroke data. In response to generating 635 the new font character, the correlation module 210 selects 640 a character encoding based on the new font character. In one embodiment, selecting 640 the character encoding based on the new font character may include defining a new character encoding corresponding to the new font character.

The storage module 215 stores 650 the character encoding, character sites, and character position. In one embodiment, the character encoding corresponds to an identified text character corresponding to the handwritten character. In certain embodiments, the storage module 215 creates a file storing 650 the character encoding, character sites, and character position.

The presentation module 220 displays 655 a text character based on the character encoding, the character size, and the character position. In some embodiments, displaying 655 the text character includes the presentation module 220 accesses the file generated by the storage module 215. In one embodiment, each character encoding indicates a particular user-specific font character. In a further embodiment, a text character may be mapped to a plurality of user-specific font characters, wherein the presentation module 220 displays 655 a particular variant of the text character based on the character encoding. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a handwriting input device that receives input stroke data;
   a processor; and
   a memory that stores code executable by the processor to:
   identify a handwritten character from the stroke data;
   determine a deviation between the stroke data corresponding to the handwritten character and a reference character corresponding to the handwritten character;
   map the handwritten character to a font character of a user-specific font set based on the stroke data deviation; and
   create a file storing a character encoding corresponding to the font character of a user-specific font set.

2. The apparatus of claim 1, wherein the reference character is preexisting font character of a user-specific font set associated with a user of the apparatus, and wherein mapping the handwritten character to a font character of a user-specific font set comprises the processor:
   determining whether the deviation between the stroke data stroke data corresponding to the handwritten character is within a threshold amount of deviation;
   selecting the reference character, in response to the stroke data being within the threshold amount of deviation; and
   generating a new font character for the user-specific font set based on the stroke data, in response to the stroke data not being within the threshold amount of deviation.

3. The apparatus of claim 2, wherein the user-specific font set comprises a plurality of variants of a text character corresponding to the handwritten character, wherein selecting a matching font character comprises selecting a best fitting variant based on the stroke data.

4. The apparatus of claim 1, wherein the processor further:
   reads the file; and
   displays a text character indicated by the character encoding using the font character of a user-specific font set.

5. The apparatus of claim 4, wherein the processor that stores, in the file, a character position of the handwriting character, wherein displaying the text character comprises displaying the text character at the character position.

6. The apparatus of claim 1, wherein the file further stores the deviation between the handwritten character and the reference character.

7. The apparatus of claim 1, wherein the processor erases the stroke data in response to mapping the handwritten character to a font character of a user-specific font set based on the deviation data.

8. The apparatus of claim 1, wherein identifying the handwritten character comprises:
   receiving stroke data from the handwriting input device, the stroke data comprising user handwriting;
   performing handwriting recognition on the stroke data; and
   identifying a text character matching the handwritten character, based on the handwriting recognition, wherein the character encoding corresponds to the identified text character.

9. The apparatus of claim 1, wherein mapping the handwritten character to a font character of a user-specific font set comprises generating a single user-specific font character representing two adjacent handwritten letters.

10. The apparatus of claim 1, wherein the handwriting input device comprises an input device selected from the group consisting of: a touchscreen, a touch panel, a digitizer, a digital pen, a scanner, an imager, and a digital camera.

11. A method comprising:
    receiving stroke data;
    identifying, by use of a processor, a handwritten character from stroke data;
    mapping the handwritten character to a user-specific font character based on the stroke data, wherein mapping the handwritten character to a user-specific font character comprises:
      determining whether the stroke data of the handwritten character matches a font character of a user-specific font set associated with a user inputting the stroke data,
      selecting a matching font character, in response to the stroke data matching the font character, and
      generating a new font character based on the stroke data, in response to the stroke data not matching any font character of the font set; and
    storing, to a file, a character encoding corresponding to the user-specific font character.

12. The method of claim 11, further comprising calculating a size and orientation of the handwritten character based on the stroke data.

13. The method of claim 12, further comprising calculating a horizontal scaling factor of the handwritten character based on the stroke data, wherein storing a character encoding corresponding to the user-specific font character further comprises storing the size, orientation, and horizontal scaling factor of the handwritten character.

14. The method of claim 12, further comprising:
identifying a user emotion based on the orientation of the handwritten character; and
associating the user-specific font character with a specific user-specific font set based on the user emotion.

15. The method of claim 11, further comprising displaying a text character indicated by the character encoding using the user-specific font character.

16. The method of claim 11, wherein determining whether the stroke data of the handwritten character matches a font character of a user-specific font set comprises determining whether a deviation between the stroke data and a user-specific font character matching the handwritten character exceeds a character variant threshold; and wherein generating a new font character based on the stroke data, in response to the stroke data not matching any font character of the font set comprises generating a new font character based on the stroke data, in response to the deviation exceeding a character variant threshold.

17. The method of claim 11, further comprising determining a character position of the handwritten character, wherein storing a character encoding corresponding to the user-specific font character further comprises associating the character encoding with the character position and with the user-specific font character.

18. The method of claim 11, further comprising receiving the stroke data from a handwriting input device, wherein the user-specific font set is dynamically generated from the user's handwriting.

19. A program product comprising a computer readable storage medium that stores code executable by a processor, the executable code comprising code to perform:
receiving stroke data from a handwriting input device;
identifying one or more handwritten characters from the stroke data;
determining a document position of each handwritten character;
determining deviation data for each handwritten character, the deviation data comprising a deviation between the stroke data corresponding to the handwritten character and a reference character corresponding to the handwritten character;
mapping the one or more handwritten characters to at least one user-specific font character, based on the deviation data; and
storing, in a file, a character encoding and a document position corresponding to the user-specific font character.

20. The program product of claim 19, the code to further perform: displaying a text character indicated by the character encoding using the user-specific font character.

\* \* \* \* \*